(12) United States Patent
Callas (10) Patent No.: US 8,859,073 B1
(45) Date of Patent: Oct. 14, 2014

(54) GRAPHIC FLOOR MAT AND METHOD OF MAKING MAT

(75) Inventor: Michael T. Callas, Minneapolis, MN (US)

(73) Assignee: Callas Enterprises, LLC, Minnetonka, MN (US)

(*) Notice: Subject to any disclaimer, the term of this patent is extended or adjusted under 35 U.S.C. 154(b) by 482 days.

(21) Appl. No.: 12/932,562

(22) Filed: Mar. 1, 2011

Related U.S. Application Data (60) Provisional application No. 61/460,139, filed on Dec. 27, 2010.

(51) Int. Cl.
*B32B 3/02* (2006.01)

(52) U.S. Cl.
USPC ............... 428/95; 428/82; 428/88; 428/122; 428/167; 343/720; 343/742

(58) Field of Classification Search
USPC ........ 343/720, 742; 428/156, 95, 82, 88, 122, 428/167, 83, 192
See application file for complete search history.

(56) References Cited

U.S. PATENT DOCUMENTS

| | | | |
|---|---|---|---|
| 2,995,849 A * | 8/1961 | Donnellan | 40/618 |
| 5,103,235 A * | 4/1992 | Clemens | 343/742 |
| 5,714,255 A | 2/1998 | Yeh | |
| 5,848,830 A | 12/1998 | Castle et al. | |
| 6,093,469 A * | 7/2000 | Callas | 428/95 |
| 7,182,040 B2 | 2/2007 | Pharo | |
| 2004/0224130 A1* | 11/2004 | Melucci et al. | 428/156 |

* cited by examiner

*Primary Examiner* — Douglas W Owens
*Assistant Examiner* — Jae Kim
(74) *Attorney, Agent, or Firm* — Richard John Bartz (57) ABSTRACT

A floor mat has a cavity accommodating an insert supporting a releasable sheet member. An adhesive releasably attaches the sheet member to the insert to allow the sheet member to be removed from the mat and replaced with another sheet member. The sheet member has visual indicia providing persons with information. Signal transmitter and receiver antennas of an electronic article surveillance system are located within the floor mat.

20 Claims, 7 Drawing Sheets

FIG. 15

GRAPHIC FLOOR MAT AND METHOD OF MAKING MAT

CROSS REFERENCE TO RELATED APPLICATION

This application claims the priority benefit of U.S. Provisional Patent Application Ser. No. 61/460,139 filed Dec. 27, 2010.

FIELD OF THE INVENTION

The invention relates to floor coverings used as a means to convey information. The floor coverings have safety features which make them suitable for prolonged use.

BACKGROUND OF THE INVENTION

Floor coverings have conventionally been used in the prior art to protect and cover an area of a floor which receives relatively high pedestrian traffic. Also, they have been used to reduce fatigue of persons standing on the floor mats by providing cushioning or padding. Some floor coverings include ornamental aspects to improve the aesthetic appearance of the covering. The conventional floor covering has also been adapted to convey information to any person within visual range.

Prior art floor coverings tend to creep and fold due to repeated and prolonged exposure to the elements, pressure, and the impact forces of material handling carts, shopping carts, pedestrian traffic, and other typical wear. The edges of the coverings in time crack, split, and curl up. This creates a significant danger to persons and objects which traverse the mat. A visibly worn floor covering could potentially subject a property owner to serious civil liability. This wear also has an effect on any messages displayed by a floor covering. Over time, the message on the mat will fade and lose its effect on persons within visual range.

U.S. Pat. No. 2,995,849 issued to Donnellan discloses a door mat having an open-ended channel that functions as a receiver and retainer for replaceable letters or designs. Key ways along opposite sides of the channel accommodate ribs on the letters to retain the letters on the mat. However, the door mat channel is not flush with the top surface of the mat. Therefore, it presents an unnecessary hazard to passersby. Additionally, the inset information and means of mounting the characters may become damaged or distorted over time through normal use.

U.S. Pat. No. 5,605,734 issued to Yeh discloses a floor carpet having phosphorescent pigment directional symbols or signs formed in the carpeting during the manufacturing process. The luminescent symbols are not replicable or otherwise interchangeable in a practicable manner.

U.S. Pat. No. 5,848,830 issued to Castle et al discloses an illuminated floor mat having an interior pocket for advertising materials. The mat includes a top transparent sheet located over a second sheet with a pocket located between the sheets. The perimeters of the sheets are sealed together to enclose the advertising material with the pocket. An electroluminescent lamp within the pocket is actuated when a person walks upon the mat to illuminate the advertising material. The mat requires a power source, and is therefore unfit to use in damp conditions or where it may come in contact with water.

U.S. Pat. No. 7,182,040 issued to Pharo et al discloses a personnel location control system utilizing path forming guidance members and line elements to describe a pedestrians walkway and rules for queuing therein. The system includes various removable visual indicia for conveying information to its users. However, the information is only relatable as a part of a series of signals and elements designed for guidance to a desired location.

None of the prior art discloses a simple and easy to manufacture movable floor covering with an easily interchangeable means of displaying information. The prior art has failed to disclose a floor covering that is also capable of withstanding extended periods of use without significant wear or otherwise causing an increased risk of injury or property damage. Therefore, there is a need for a floor covering which can display information in a simple, practical and easily interchangeable manner while withstanding normal wear associated with prolonged use.

SUMMARY OF THE INVENTION

The invention relates to a floor covering which includes a means for conveying information to people within visual range. A first embodiment of the mat consists of a frame member and a replaceable sheet member which is affixed by a selectively releasable fastener to the frame member. The replaceable sheet member includes lettering, shapes or symbols intended to convey a selective message to any persons within visual range of the mat, and a material for increasing the friction between the face of the mat and any persons or objects which come in contact with the mat. The replaceable sheet member consists of a soft plastic or plastic-like material face and a soft elastic polymer or elastic polymer-like backing such that the replaceable sheet member does not interfere with the middle member's elastic function during use. The replaceable sheet member may be removed and another replaceable sheet member may be added in the first member's place with another set of information.

The mat utilizes various methods and structures to avoid undesirable deformation and wear through prolonged use. The frame member has a peripheral edge portion around the mat. The edging of the frame member ensures that the extremities will remain flat and level relative to the ground. The edge is secured to the top and bottom edge portions of the pad such that water and dirt do not collect within the mat. The edge may include an upwardly inclined body, a lip joined to the body, and a web joined to the body which is affixed to the base, the fibers and the backing in order to allow the periphery of the mat to retain its shape. The edge is affixed at an angle such that wheeled carts and trucks can be readily rolled on and off the mat without experiencing undue friction or damaging the materials of the pad and edge.

The mat has a pad of greige material having a base and fibers extending upwardly from the base such that they provide desirable traction for any persons or implements traversing the face of the mat. The fibers may be affixed to the base member using any suitable means for permanently attaching the fibers to the base. This includes, but is not limited to, looping, knitting, or mechanically interlocking by needle punching or heat bonding. The base member includes a backing or bottom layer with a means for providing increased friction with any variable surface such that the weight of the mat will provide enough force for the mat to remain in place during use. The backing has linear treads separated with grooves that grip a surface to prevent creep and folding of the mat relative to the underlying surface. Electronic article surveillance antennas are included within the floor mat to operably establish an interrogation zone above the floor mat. The antennas comprise a transmitter antenna and a receiver antenna that are energized with an electronic control unit to establish the interrogation zone. The transmitter and receiver antennas include electronic conductors having double loop configurations. The antennas on the floor mat do not include tower or external structures that detract from the aesthetics of exit environments of a building.

The face of the replaceable sheet member and the fibers form a level plane such that there is no lip or incongruity in the surface of the mat. This uniform facing of the mat reduces the likelihood of slipping and falling or other injury. The fibers extending upwardly are included as a means for increasing friction between the mat and a person or object coming in contact therewith. The center layer is positioned below the replaceable sheet member. The center layer is made of material having an elastic nature such that the center member will deform to absorb a fraction of the impact force of an object coming in contact with the face of the mat and then reform to the original shape. This memory is a means for reducing the impact of a pedestrian's footstep.

The mat can be of any suitable size, shape, and thickness in order to cover any floor or outdoor surface such that a pedestrian or object may safely and efficiently traverse the mat. The mat is preferably, but not necessarily, made of an elastic polymer or other rubber-like substance. The replaceable sheet member may be releasably affixed to the middle layer using any suitable fastener such that the replaceable sheet member will remain in place relative to the frame member during use. The fastener must also allow the sheet member to be selectively removed from the frame member such that the frame member is not damaged and a new sheet member may be attached. It is obvious to one skilled in the art to incorporate any sort of visual message or vary any visual aspect in the mat, this includes, but is not limited to, color, shape, or texture.

A DETAILED DESCRIPTION OF PREFERRED EMBODIMENT AND METHOD FOR MAKING MAT

Figure 1:
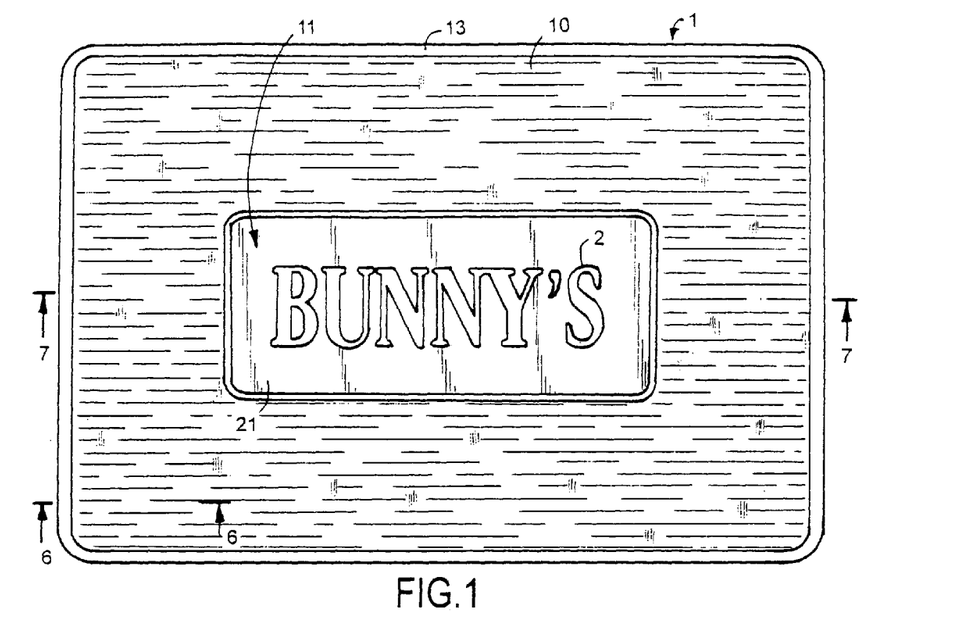
FIG. 1 is a top plan view of the graphic floor mat.

FIG. 1-8 illustrate an embodiment of the graphic floor mat. Referring to FIG. 1, mat 1 includes a frame member 10 and a replaceable sheet member 11. The face of frame member 10 includes edge 13 which makes up the outer extremities of frame member 10, a surface of fibers 15 and an insert 23 for supporting replaceable sheet member 11. Edge 13 may be oriented at any acute inwardly oriented angle relative to the underlying surface such that it facilitates smooth and uniform transition for any users traversing between the underlying surface and fibers 15. Mat 1 is custom made for commercial or residential buildings as vestibule and entrance mat to divert and displace water, sand, and dirt in all forms so as to prevent the unwanted material from being carried into buildings by persons and wheels. The mat 1 is periodically cleaned to maintain its use as a preventative measure against dirt. Mat 1 holds its shape and position relative to the underlying surface.

Figure 2:
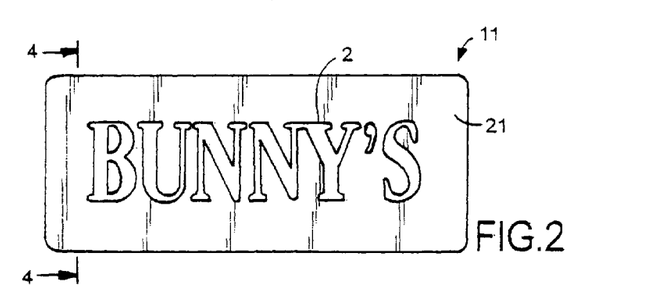
FIG. 2 is a top plan view of the replaceable sheet member shown in FIG. 1.

FIG. 2 illustrates a replaceable sheet member 11. Replaceable sheet member 11 includes indicia 2 or information for displaying a visual message to any person within visual range of the mat. Replaceable sheet member 11 displays ink forming lettering as visual message 2 on opaque backing 22. A transparent face 21 is affixed over visual message 2 to backing 22 such that face 21 is permanently adhered to backing 22 while allowing underlying visual message 2 to be seen by any persons within visual range. Visual message 2 is protected under face 21. Face 21 may be made of any suitable material such that it remains translucent during use. In the alternative, visual message 2 may be reverse printed on downwardly facing face 21 such that it may be viewed in the desired orientation by persons within visual range. Visual message 2 may be of any shape, size, and material suitable to convey meaning to any persons within visual range.

Figure 3:
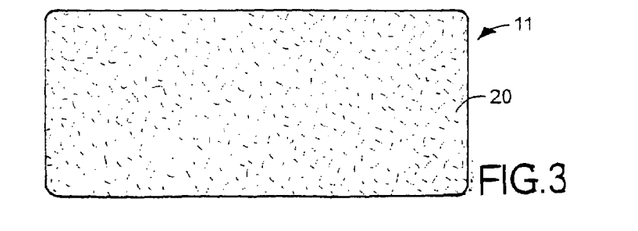
FIG. 3 is a bottom plan view of the replacable sheet member of FIG. 2.
Figure 4:
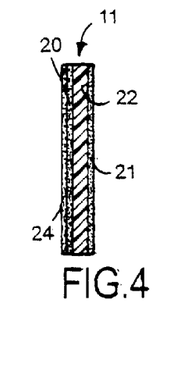
FIG. 4 is a sectional view taken along line 4-4 of FIG. 2.

FIGS. 2 to 4 illustrates a first embodiment of releasable sheet member 11 having a flat generally rectangular backing 21. Backing 21 has a connector 20 for releasably attaching replaceable sheet member 11 to insert 23 mounted on frame member 10. Connector 20 covers the entire bottom surface of backing 21. This connector 20 has sufficient strength such that replaceable sheet member 11 will not move relative to frame member 10 during use. The connection may be accomplished by any connector that releaseably affixes two surfaces together to withstand the normal pressures associated with the use of a floor mat. Connector 20 includes, but is not limited to, adhering, pressure sensitive adhesive chemically bonding, affixing mating hook and loop pads, or the use of releasable fasteners. A cover or tape 24, such as a sheet of paper, is located over connector 20 to protect connector 20. Cover 24 is removed when sheet member 11 is placed on mat 1.

FIG. 4 illustrates a sectional view taken along line 4-4 of FIG. 2. Backing 22 may be of any size, thickness, and shape such that face 21 of replaceable sheet member 11 remains on the same plane as the average reach of fibers 15. Face 21 may be of any thickness such that it will possess sufficient translucidity, protects visual message 2, and withstands the above-mentioned wear associated with use. Face 21 must be of sufficient thickness to protect visual message 2 such that visual message 2 will not be affected by any outside forces. For example, face 21 is a relatively thin layer of clear polymer material.

Figure 5:
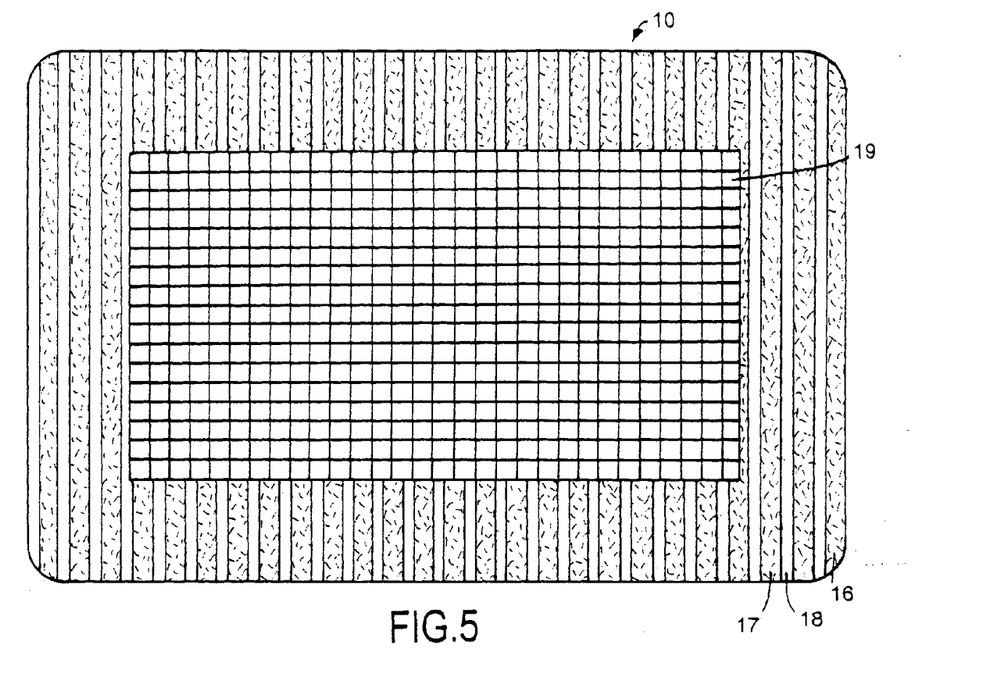
FIG. 5 is a bottom plan view of the graphic floor mat of FIG. 1.

FIG. 5 illustrates a bottom plan view of the first embodiment of mat 1. Bottom layer 16 has a plurality of linear ribs 17 and linear grooves 18 open to the underlying surface. Bottom layer 16 can be any high friction and tacky plastic or polymer which creates sufficient friction with the underlying surface to minimize creep and folding of mat 1 and increase the overall cushion character. Mat 1 includes bottom layer 19 which is affixed to bottom layer 16, and middle layer 25 to provide additional support and protection for middle layer 25.

Bottom layer 19 must be of sufficient size, strength and orientation to prevent middle layer 25 from coming in contact with the underlying surface or moving laterally relative to frame member 11. Bottom layer 19 may be affixed to bottom layer 16 and middle layer 25 using any suitable means capable of withstanding normal wear associated with use. Bottom layer 19 is a fiber mesh secured with an adhesive or bonding material to bottom layer 16 of mat 1.

Figure 6:
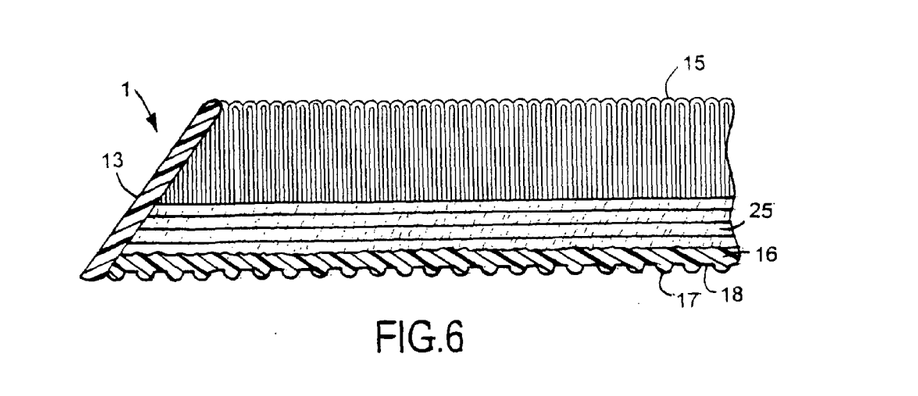
FIG. 6 is an enlarged sectional view taken along line 6-6 of FIG. 1.

FIG. 6 illustrates an enlarged sectional view taken along line 6-6 of FIG. 1. Base 25 has greige material affixed to backing layer 16 and upright loop fibers 15. Edge 13 is affixed to base 25, backing layer 16 and upright loop fibers 15 such that any component part of mat 1 may not interrupt the continuity of the facing at the outer extremity of mat 1. In addition, edge 13 must be of sufficient length to contact fibers 15 and the underlying surface such that wheeled carts and trucks may readily roll on and off mat 1. Each component must be affixed with enough strength to withstand normal wear associated with use. For example, base 13 and fibers 15 are mechanically interlocked by needle punching and heat bonding.

Base 13 and fibers 14 may be of any synthetic or rubberized material capable of withstanding normal wear associated with use, and do not absorb water. For example, base 13 may be non-woven polypropylene with an 18, 60, 100 denier blend and a fiber weight of 55 oz. per square yard. Fibers 15 may be polypropylene, rubber or any suitable elastomer. In addition, the means of affixing each component part must result in a bond which is resistant to water, light, and normal wear associated with use. For example, the means for affixing could be a layer of liquid ethylene vinyl chloride (EVCL).

Figure 7:
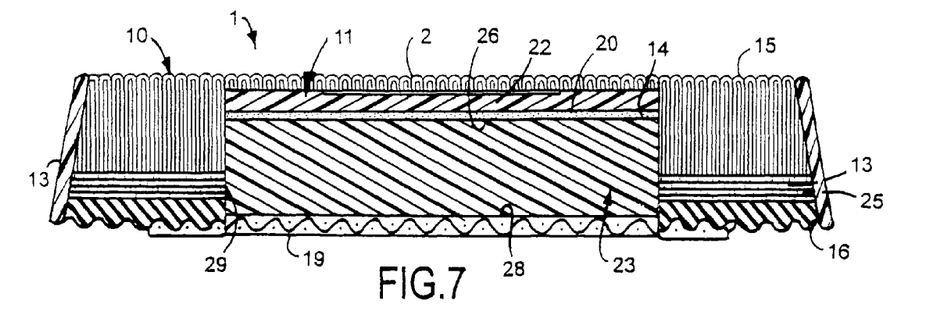
FIG. 7 is a sectional view taken along line 7-7 of FIG. 1.

FIG. 7 illustrates a sectional view taken along line 7-7 of FIG. 1. Frame member 10 includes base 25 affixed to edge 13, bottom layer 16 and fibers 15. Additionally, edge 13 is affixed to fibers 15 and bottom layer 16. An insert or pad 23 is affixed to bottom layer 19 such that insert 23 will not move relative to frame member 10 during use. Insert 23 is releasably connected to replaceable sheet member 11 using connector 20 such that replaceable sheet member 11 may be selectively removed from mat 1 and replaced with another sheet member.

Figure 8:
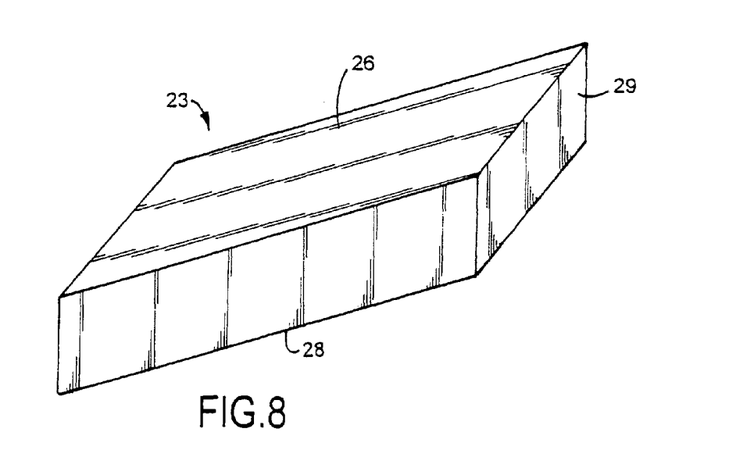
FIG. 8 is a perspective view of the middle layer supporting the replacable sheet member shown in FIG. 2.

FIG. 8 illustrates a perspective view of insert 23 supporting the replaceable sheet member 11 shown in FIG. 2. Insert 23 is a generally rectangular pad of resilient and compressible material such that it may deform under some force and reform to original shape and volume; This memory must be sufficient such that it will withstand normal wear during use and provides sufficient diffusion of the energy associated with a user standing or walking over mat 1. For example, insert 23 is constructed from natural closed cell rubber with a compression sufficient to provide cushion to a user. Insert 23 could alternatively be constructed from synthetic rubber, closed or open cell foam, or any suitable elastomer or polymer capable of providing cushion to a user.

Insert 23 has a flat top surface 26 and suitable thickness to provide cushion to a user, and allow replaceable sheet member 11 to rest on the same horizontal plane relative to the underlying surface as the average maximum height of fibers 15. Insert 23 may deform to a degree suited to the particular task for mat 1. For example, where mat 1 is to be used out of doors, insert 23 may be less malleable in order to withstand outdoor pressures. The connector 20 on backing 22 is in continuous surface engagement with the top surface 26 of insert 23.

Figure 9:
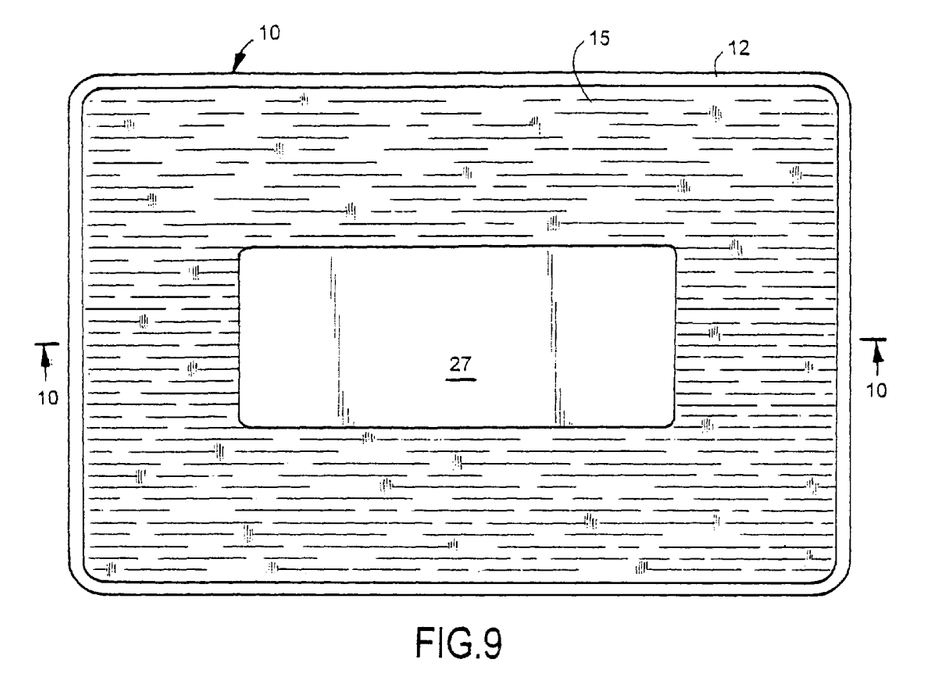
FIG. 9 is a top plan view of the graphic floor mat showing the method of making the graphic floor mat.
Figure 10:
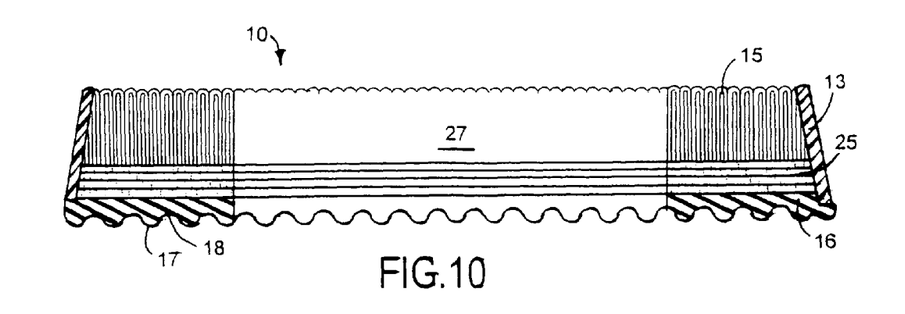
FIG. 10 is a sectional view taken along line 10-10 of FIG. 9.

The process for making mat 1 is illustrated in FIGS. 9-14. FIG. 9 illustrates a top plan view of mat 1 showing a method of making the graphic floor mat. The unbleached and undyed plastic fibrous material made with a needle punching and heat bonding process, known as greige is incorporated herein by reference to U.S. Pat. No. 6,093,469 issued to Mr. T. Callas. A middle portion is removed from frame member 10 of the above-referenced invention to form a rectangular cavity 27 in frame member 10. Cavity 27 may be any desirable shape, including, but not limited to, a circular, rectangular, ovular, or rhomboidal shape. Cavity 27 is formed from the removal of each layer of mat 1 including fibers 15, base 25 and bottom layer 16. Cavity 27 may be created through any method able to precisely delineate and remove an area equal to accommodate insert 23 and replaceable sheet member 11. For example, cavity 27 may be created through cutting or melting of the material. FIG. 10 is a sectional view taken along line 10-10 of FIG. 9. Cavity 27 is surrounded by a portion of base 25, bottom layer 16, and fibers 15.

Figure 11:
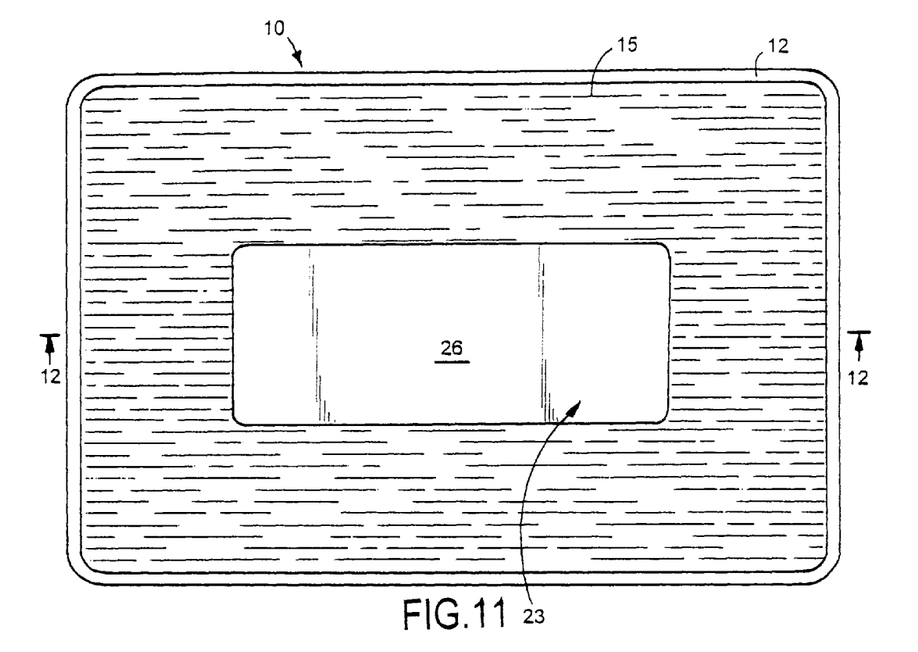
FIG. 11 is a top plan view of the floor mat with the insert within the floor mat.
Figure 12:
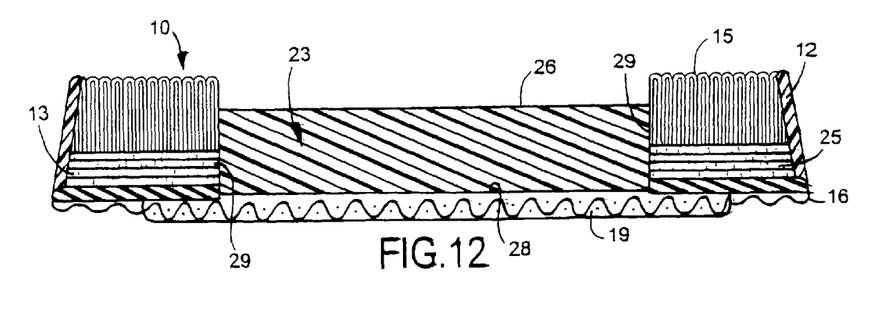
FIG. 12 is a sectional view taken along line 12-12 of FIG. 11.

FIG. 11 illustrates a top plan view of mat 1 showing insert 23 inset in frame member 10. Insert 23 is constructed of suitable size such that it will fit within frame member 10 to allow replaceable sheet member 11 to rest on the same plane as fibers 15 as described above. Insert 23 is placed within cavity 27. FIG. 12 illustrates a sectional view taken along line 12-12 of FIG. 11. Bottom grid layer 19 is of sufficient size such that it covers the bottom of cavity 27 and may be affixed to bottom layer 16. Bottom layer 19 is then affixed to the bottom surface 28 of insert 23 such that insert 23 will not move relative to frame member 10 during use. The entire bottom surface 28 of insert 23 is attached with an adhesive or bonding material to bottom grid layer 19. The same adhesive is used to attach bottom grid layer 19 to bottom layer 16 of frame member 10. The upright side surfaces 29 of insert 23 are also attached with the adhesive to middle layer 25 and fibers 15 of frame member 10.

Figure 13:
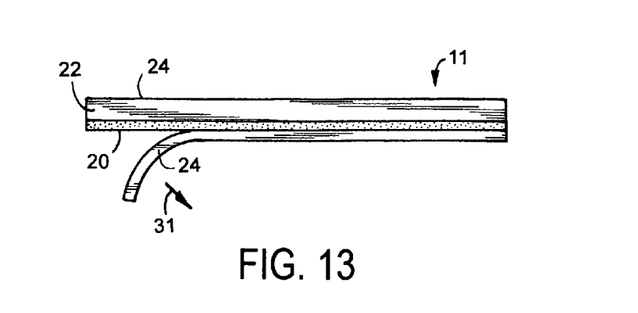
FIG. 13 is a side elevational view of the replaceable sheet member showing the adhesive cover tape being removed.

As shown in FIG. 13 cover tape 24 is removed from adhesive 20 on sheet member 11. Tape 24 is pulled from adhesive 20 as shown by arrow 31. Sheet member 11 is now in condition to be placed into cavity 27 on top of insert 23.

Figure 14:
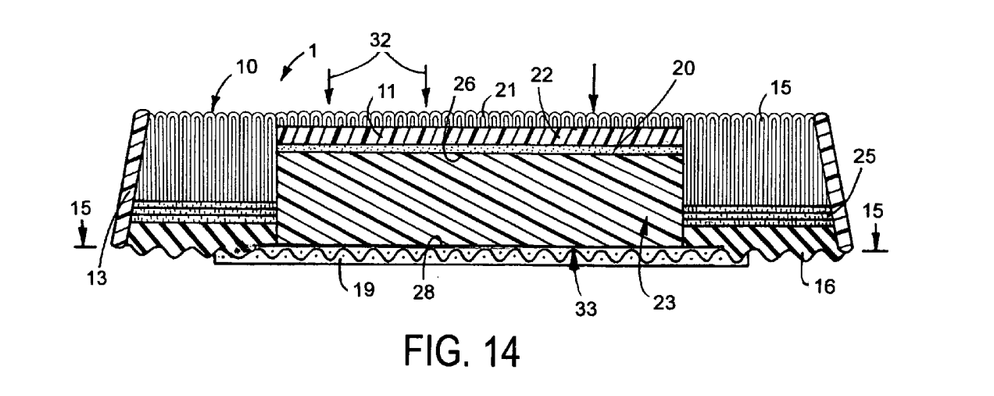
FIG. 14 is a sectional view similar to FIG. 7 showing the sheet member place on the insert of the mat.

Sheet member 11 is placed flat on top surface 26 of insert 23. As shown in FIG. 14 adhesive 20 is in surface contact with the top surface 26 of insert 23. Downward pressure or force, shown by arrows 32, is applied to sheet member 11 to firmly secure sheet member 11 to insert 23. The adhesive 20, being a pressure sensitive material, holds sheet member 11 on insert 23. The top surface of sheet member 11 is a small distance below the top ends of fiber 15. The indicia 2 is visible from above mat 1.

In use, sheet member 11 can be removed from mat 1 by separating sheet member 11 from insert 23. Sufficient force must be applied to sheet member 11 to overcome the holding action of adhesive 20. A new sheet member 11, having new or same indicia 2, can be mounted on insert 23. The mat 1 can then be placed in a selected location, such as a door entrance.

Figure 15:
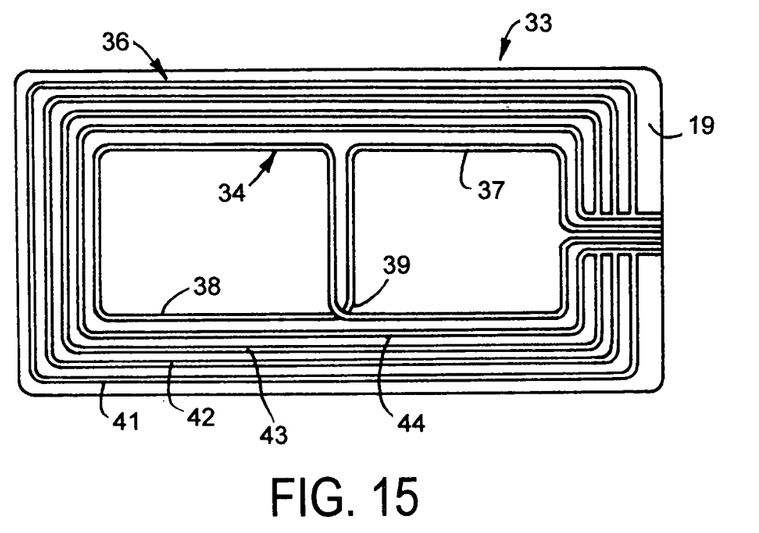
FIG. 15 is a sectional view taken along the line 15-15 of FIG. 14 showing the transmitter and receiver antennas of an electronic article surveillance system.

As shown in FIGS. 14 and 15, an electronic article surveillance antenna system 33 is embodied within mat 1 to provide an interrogation zone above the mat. The antenna system 33 has a transmitter antenna 34 and a receiver antenna 36 located between backing layer 16, insert 23 and bottom layer 19. The antennas 34 and 36 are sealed between layers 16 and 19 to protect and prevent damage of the antennas. Receiver antenna 36 secured to bottom layer 19 extends around and parallel to transmitter antenna 34. Ana electronic article surveillance control unit connected to an electric power supply is wired to antennas 34 and 36. The control unit includes a swept frequency electrical detection system having electronic components. An example of this control unit is disclosed in U.S. Pat. No. 3,500,373 and U.S. patent application Ser. No. 12/322,846 incorporated herein by reference.

Transmitter antenna 34 comprises an electric conductor ribbon or printed conductor having a first conductor loop 37 and a second conductor loop 38 interconnected with a crossover conductor 39. Loops 37 and 38 and crossover conductor 39 are secured to bottom layer 19. First conductor loop 37 is wired to an electronic control unit (not shown). Conductor loops 37 and 38 are coplanar and equal in length and size. The combination of the sizes of each loop 37 and 38, the magnitude of the currents within the loops, and direction of the currents generate electric fields form each loop, when summed, net an electric field which approaches zero. the electric current in loops 37 and 38 flows in opposite directions and thereby generates substantially canceling electric fields. Loops 37 and 38 can be electric conductor wires attached to bottom layer 19 or secured with an adhesive or plastic material directly to the bottom of mat 1.

Receiver antenna 36 comprises a plurality of electric conductor ribbons or printed conductors 41, 42, 43 and 44 located around transmitter antenna 34. Conductors 41 and 44 are secured to bottom layer 19. Adjacent conductors 41 to 44 are laterally spaced an equal distance from each other and have terminal ends connected to the electronic control unit. Electronic article surveillance control unit operates to generate an interrogation zone above mat 1. Conductors 41 and 44 can be electric conductor wires attached to bottom layer 119 or secured with an adhesive or plastic material directly to the bottom of mat 1. As shown in FIG. 14, bottom layer 19 covers transmitter antenna 34 and receiver antenna 36 to protect the electric conductors of antennas 34 and 36.

The preferred embodiment of a graphic floor mat with electronic article surveillance control transmitter and receiver antennas and method of making the mat have been illustrated and described, it will be understood that changes in the materials, construction, and arrangement of structure may be made by persons skilled in the art without departing from the invention.

I claim:

1. A mat comprising:
   a base having a top surface and a bottom surface,
   a plurality of fibers projecting upwardly from the top surface of said base,
   a peripheral edge affixed to said base with an upwardly inclined top surface,
   a first layer affixed to the bottom of said base to provide friction with an underlying surface,
   a cavity surrounded by the fibers, base and first layer and extended through the fibers, base and first layer,
   an elastic insert located in the cavity, said insert having a top surface and a bottom surface,
   a second layer located on the bottom of said first layer and the bottom surface of said insert;
   an adhesive material securing the second layer and bottom surface of said insert to the second layer, and
   a replaceable member located in the cavity above the insert, said replaceable member having a front surface, and a bottom surface, and
   indicia on the front surface of the replaceable member for displaying a visual message; and
   a connector for releasably affixing said bottom surface of said replaceable member to said top surface of the insert such that the front surface of the replaceable member is located in generally a horizontal plane relative to the average highest point of said fibers.

2. The mat of claim 1 wherein: the replaceable member consists of a generally flat and flexible member with indicia for displaying a visual message.

3. The mat of claim 1 wherein: the base is a polypropylene greige and said fibers are upright loop fibers joined to said greige.

4. The mat of claim 1 wherein: said first layer has linear treads separated with linear grooves.

5. The mat of claim 1 including:
   a first antenna of an electronic article surveillance system located on said second layer below said insert and between the first and second layers, and
   a second antenna of an electronic article surveillance system located on the said second layer below said insert and between the first and second layers.

6. The mat of claim 5 wherein:
   the first antenna comprises first and second electric conductor loops and a crossover electric conductor connecting the first and second loops, and
   the second antenna comprises a plurality of electric conductors surrounding the first antenna.

7. The mat of claim 1 including:
   a signal receiver antenna of an electronic article surveillance system located between the insert and second layer.

8. A mat comprising:
   a base,
   a plurality of fibers projecting upwardly from said base,
   said base and fibers surrounding a cavity,
   a bottom layer secured to the base and extended under the cavity,
   an insert located in the cavity,
   means securing the insert to the bottom layer,
   a replaceable sheet member located in the cavity above the insert,
   a connector releasably securing the sheet member to the insert,
   said sheet member having a top surface, and
   indicia displaying a visual message on the top surface of the sheet member.

9. The mat of claim 8 wherein:
   the insert comprises a pad of resilient and compressible material.

10. The mat of claim 8 including:
    a layer having a plurality of ribs and grooves secured to the bottom of the base.

11. The mat of claim 8 including:
    a transparent face member located over said replaceable sheet member covering the indicia on said sheet member.

12. The mat of claim 8 wherein:
    the replaceable sheet member comprises a generally flat and flexible member.

13. The mat of claim 8 including:
    a first antenna of an electronic article surveillance system located on said bottom layer below said insert, and
    a second antenna of an electronic article surveillance system located on the said bottom layer below said insert.

14. The mat of claim 13 wherein:
    the first antenna comprises first and second electric conductor loops and a crossover electric conductor connecting the first and second loops, and
    the second antenna comprises a plurality of electric conductors surrounding the first antenna.

15. The mat of claim 8 including:
    a signal receiver antenna of an electronic article surveillance system located between the insert and bottom layer.

16. A method of making a mat having a replaceable sheet member comprising:

providing a mat having a base with a top surface and a bottom surface and a plurality of fibers projected upwardly from the top surface of said base, a peripheral edge affixed to said base with an upwardly inclined top surface, a first layer affixed to the bottom of said base to provide friction with an underlying surface, removing a portion of said base and fibers to create a cavity in the mat extended through the fibers, base and first layer, where the cavity is surrounded by the fibers, base and first layer, providing an elastic insert located in the cavity, said insert having a top surface and a bottom surface, providing a second layer located on the bottom of said first layer and the bottom surface of said insert; providing an adhesive material securing the second layer and bottom surface of said insert to the second layer, and a replaceable sheet member located in the cavity above the insert, said replaceable member having a front surface, and a bottom surface, and indicia on the front surface of the replaceable member for displaying a visual message; and providing a connector for releasably affixing said bottom surface of said replaceable member to said top surface of the insert such that the front surface of the replaceable member is located in a generally horizontal plane relative to the average highest point of said fibers.

17. The method of claim 16 including:

securing a layer of material having ribs and grooves to the bottom of the base of the mat.

18. The method of claim 16 including:

covering the visual indicia on the replaceable sheet member with a transparent material.

19. The method of claim 16 including:

locating first and second antennas of an electronic article surveillance system on the bottom layer of the mat.

20. The method of claim 16 including:

locating a first antenna having first and second electric conductor loops and a crossover electric conductor connecting the first and second loops on the bottom layer of the mat, and locating a second antenna having a plurality of electric conductors surrounding the first antenna on the bottom layer of the mat.

* * * * *